US010036334B2

(12) United States Patent
Sjöholm et al.

(10) Patent No.: US 10,036,334 B2
(45) Date of Patent: Jul. 31, 2018

(54) FUEL VALVE FOR INJECTING GASEOUS FUEL INTO A COMBUSTION CHAMBER OF A SELF-IGNITING INTERNAL COMBUSTION ENGINE AND METHOD

(71) Applicant: MAN Diesel & Turbo, filial af MAN Diesel & Turbo SE, Tyskland, Copenhagen SV (DK)

(72) Inventors: Johan Sjöholm, Furulund (SE); Johan Hult, Ljungby (SE)

(73) Assignee: MAN Diesel & Turbo, filial af MAN Diesel & Turbo SE, Tyskland, Copenhagen SV (DK)

( * ) Notice: Subject to any disclaimer, the term of this patent is extended or adjusted under 35 U.S.C. 154(b) by 0 days.

(21) Appl. No.: 15/515,647

(22) PCT Filed: Oct. 12, 2015

(86) PCT No.: PCT/DK2015/050309
§ 371 (c)(1),
(2) Date: Mar. 30, 2017

(87) PCT Pub. No.: WO2016/058611
PCT Pub. Date: Apr. 21, 2016

(65) Prior Publication Data
US 2017/0298843 A1  Oct. 19, 2017

(30) Foreign Application Priority Data
Oct. 17, 2014 (DK) .................................. 2014 00591

(51) Int. Cl.
*F02M 21/02* (2006.01)
*F02M 43/00* (2006.01)
(Continued)

(52) U.S. Cl.
CPC .......... *F02D 19/0647* (2013.01); *F02B 37/00* (2013.01); *F02D 19/066* (2013.01);
(Continued)

(58) Field of Classification Search
CPC ............. F02D 19/0647; F02D 19/0694; F02D 19/066; F02D 19/105; F02D 19/0689;
(Continued)

(56) References Cited

U.S. PATENT DOCUMENTS 4,782,794 A   11/1988  Hsu et al.
6,073,862 A * 6/2000  Touchette ............... F02D 19/10
                                              239/408
(Continued)

FOREIGN PATENT DOCUMENTS

CN   101694197 A    4/2010
DE     3012418 A1  10/1981
(Continued)

OTHER PUBLICATIONS

International Search Report, Application No. PCT/DK2015/050309, dated Dec. 11, 2015, 7 pages.
(Continued)

*Primary Examiner* — Syed O Hasan
(74) *Attorney, Agent, or Firm* — Ziegler IP Law Group, LLC

(57) ABSTRACT

A fuel valve includes a housing, a nozzle with nozzle holes opening to a volume inside the nozzle at the front end of the housing, a gaseous fuel inlet port in the housing connected to high pressure gaseous fuel, an axially displaceable valve needle received in a longitudinal bore in the housing, and rests on a valve seat in a closed position and has lift from the valve seat in an open position, the valve seat placed between a fuel chamber and an outlet port, the fuel chamber connected to the fuel inlet port, the outlet port connected to the
(Continued)

volume in the nozzle, an actuator system for moving the needle between the closed and open positions, an ignition liquid inlet port connected to high pressure ignition liquid, and a conduit connecting the ignition liquid inlet port to the fuel chamber, the conduit including a fixed flow restriction.

15 Claims, 7 Drawing Sheets

(51) Int. Cl.

| | | |
|---|---|---|
| F02M 51/00 | (2006.01) | |
| F02D 19/06 | (2006.01) | |
| F02D 19/10 | (2006.01) | |
| F02M 43/04 | (2006.01) | |
| F02M 67/14 | (2006.01) | |
| F02B 37/00 | (2006.01) | |

(52) U.S. Cl.
CPC ....... *F02D 19/0694* (2013.01); *F02D 19/105* (2013.01); *F02M 43/04* (2013.01); *F02M 67/14* (2013.01)

(58) Field of Classification Search
CPC ........ F02D 19/10; F02M 67/14; F02M 43/04; F02M 21/0209; F02M 21/0212; F02M 21/0266; F02M 57/026; F02B 37/00; F02B 25/04
USPC .......................... 123/27 GE, 525–527, 304; 239/584–585.5
See application file for complete search history.

(56) References Cited

U.S. PATENT DOCUMENTS

| | | | |
|---|---|---|---|
| 6,298,833 | B1 | 10/2001 | Douville et al. |
| 6,336,598 | B1 | 1/2002 | Touchette et al. |
| 3,022,303 | A1 | 5/2015 | Mumford et al. |
| 2006/0086825 | A1* | 4/2006 | Date ...................... F02M 43/04 239/408 |
| 2009/0020631 | A1 | 1/2009 | Mashida et al. |
| 2009/0150050 | A1* | 6/2009 | Mashida ............. F02D 19/0631 701/103 |
| 2011/0108631 | A1* | 5/2011 | Mumford ........... F02M 21/0263 239/5 |
| 2013/0081593 | A1* | 4/2013 | Coldren ............. F02M 63/0045 123/304 |
| 2014/0216405 | A1* | 8/2014 | Kato ..................... F02M 53/02 123/445 |

FOREIGN PATENT DOCUMENTS

| | | |
|---|---|---|
| DE | 3742759 A1 | 9/1988 |
| DE | 1022009002554 A1 | 1/2010 |
| EP | 0778410 A1 | 6/1997 |
| EP | 2543870 A1 | 1/2013 |
| GB | 2126650 A | 3/1984 |
| JP | 2006-118470 A | 5/2006 |
| JP | 2010-144516 A | 7/2010 |
| WO | 2013/153843 A1 | 10/2013 |

OTHER PUBLICATIONS

Denmark Patent Office, Third technical Office Action, Decision to Grant, Application No. PA 201400591, dated Sep. 17, 2015, 2 pages.
International Preliminary Report on Patentability and Written Opinion received for International Patent Application No. PCT/DK2015/050309, dated Apr. 18, 2017, 12 pages.
Healthy Markets Offshore, Motorship, Nexus Media Communications, Swanley, Kent, GB, XP000533316, ISSN: 0027-2000. vol. 75, No. 903, Oct. 1, 1995, pp. 43-44.

* cited by examiner

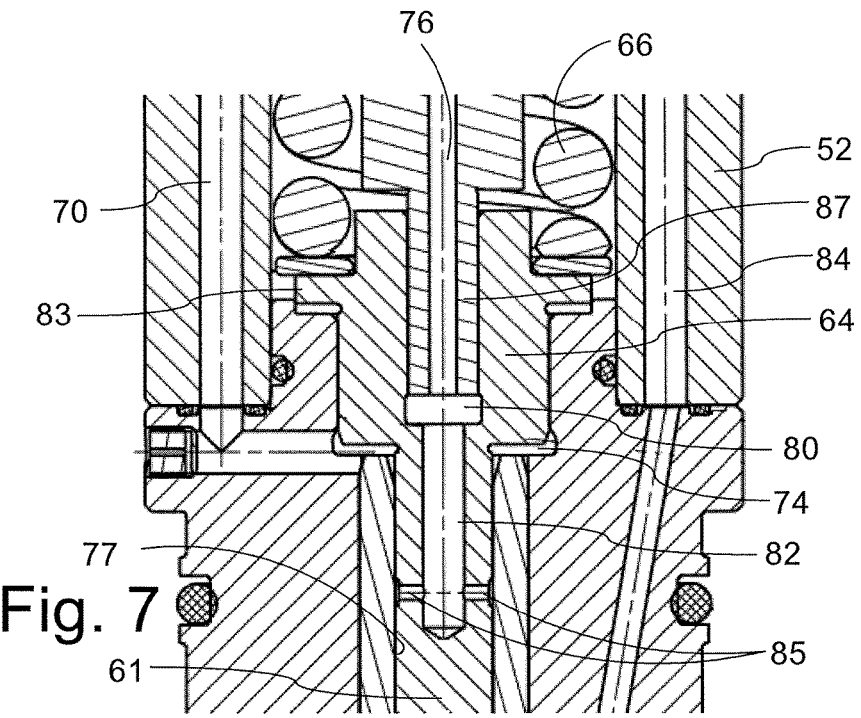
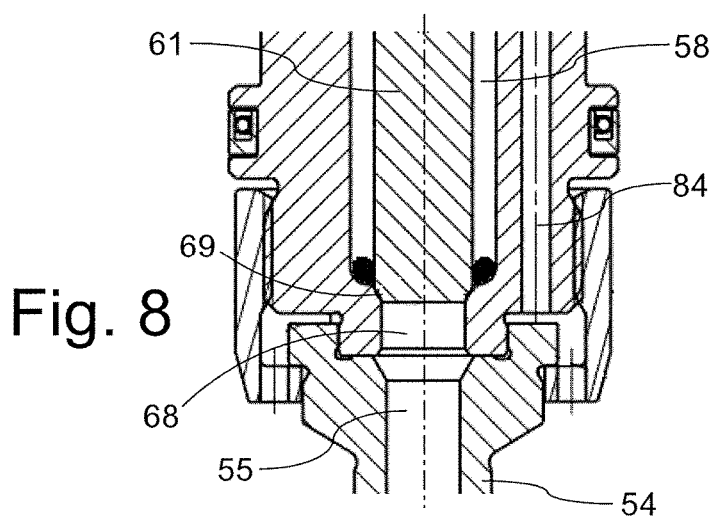

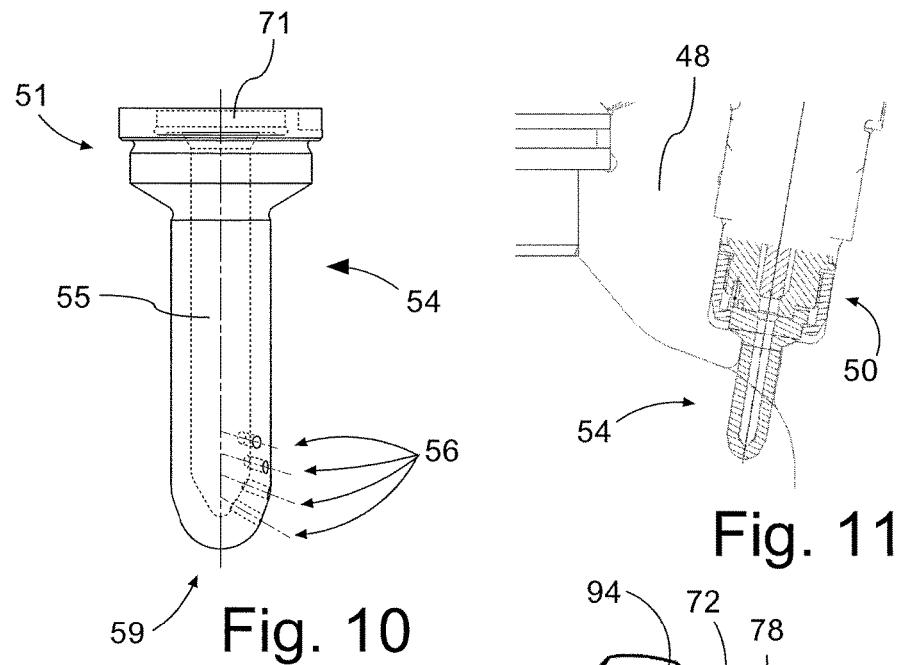
Fig. 10
Fig. 11
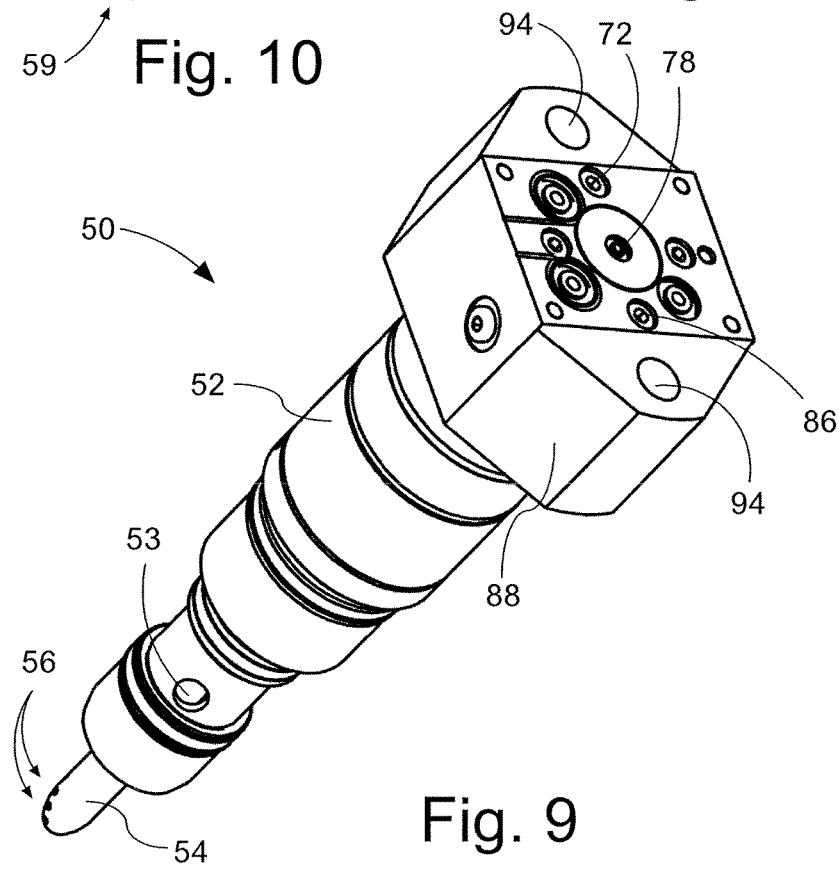
Fig. 9

//////
FUEL VALVE FOR INJECTING GASEOUS FUEL INTO A COMBUSTION CHAMBER OF A SELF-IGNITING INTERNAL COMBUSTION ENGINE AND METHOD

FIELD OF THE INVENTION

The present invention relates to a gaseous fuel valve for a self-igniting internal combustion engine with a gaseous fuel supply system, in particular to a gaseous fuel valve for a large low-speed uniflow turbocharged two-stroke internal combustion engine with a gaseous fuel supply system.

BACKGROUND ART

Large low-speed two-stroke self-igniting (Diesel) engines of the crosshead type are typically used in propulsion systems of large ships or as prime mover in power plants. Very often, these engines are operated with heavy fuel oil or with fuel oil.

Recently, there has been a demand for large two-stroke diesel engines to be able to handle alternative types of fuel, such as gas, coal slurry, petroleum coke and the like, in particular gas.

Gaseous fuels, such as natural gas are relatively clean fuels that result in significantly lower levels of sulfurous components, NOx and CO2 in the exhaust gas when used as fuel for a large low-speed uniflow turbocharged two-stroke internal combustion engine when compared with e.g. using heavy fuel oil as fuel.

However, there are problems associated with using a gaseous fuel in a large low-speed uniflow turbocharged two-stroke internal combustion engine. One of those problems is the willingness and predictability of gas to self-ignite upon injection into the combustion chamber and both are essential to have under control in a self-igniting engine. Therefore, existing large low-speed uniflow turbocharged two-stroke internal combustion engines use pilot injection of oil or other ignition liquid simultaneously with the injection of the gaseous fuel to ensure reliable and properly timed ignition of the gaseous fuel.

Large low-speed uniflow turbocharged two-stroke internal combustion engines are typically used for the propulsion of large ocean going cargo ships and reliability is therefore of the utmost importance. Gaseous fuel operation of these engines is still a relatively recent development and reliability of the operation with gas has not yet reached the level of conventional fuel. Therefore, existing large low-speed two-stroke diesel engines are all dual fuel engines with a fuel system for operation on gaseous fuel and a fuel system for operation with fuel oil so that they can be operated at full power running on the fuel oil only.

Due to the large diameter of the combustion chamber of these engines, they are typically provided with three fuel injection valves per cylinder, separated by an angle of approximately 120° around the central exhaust valve. Thus, with a dual fuel system there will be three gaseous fuel valves per cylinder and three fuel oil valves per cylinder with one fuel oil injection valve placed close to a respective gas injection valve so as to ensure reliable ignition of the gaseous fuel and thus, the top cover of the cylinder is a relatively crowded place.

In the existing dual fuel engines the fuel oil valves have been used to provide the pilot oil injection during operation with gaseous fuel. These fuel oil valves are dimensioned so as to be able to deliver fuel oil in an amount required for operating the engine at full load on fuel oil only. However, the amount of oil injected in a pilot injection should be as small as possible to obtain the desired reduction in emissions. Dosage of such a small amount with a full size fuel injection system that can also deliver the large amount necessary for operation at full load poses significant technical problems, and is in practice very difficult to achieve and therefore the pilot oil dosage has in existing engines been with a larger quantity per fuel injection event than desirable, especially at medium and low load. The alternative of an additional small injection system that can handle the small pilot amount is a considerable complication and cost up. Further, additional small pilot oil injection valves render the top cover of the cylinder even more crowded.

DISCLOSURE OF THE INVENTION

On this background, it is an object of the present application to provide a fuel valve for a self-igniting internal combustion engine that overcomes or at least reduces the problems indicated above.

This object is according to one aspect achieved by providing a fuel valve for injecting gaseous fuel into the combustion chamber of a self-igniting internal combustion engine, the fuel valve comprising an elongated fuel valve housing with a rear end and a front end, a nozzle with a plurality of nozzle holes opening to a sac volume inside the nozzle, the nozzle being disposed at the front end of the elongated valve housing, a gaseous fuel inlet port in the elongated fuel valve housing for connection to a source of high pressure gaseous fuel, an axially displaceable valve needle slidably received in a longitudinal bore in the elongated valve housing, the axially displaceable valve needle having a closed position and an open position, the axially displaceable valve needle rests on a valve seat in the closed position and the axially displaceable valve needle has lift from the valve seat in the open position, the valve seat being placed between a fuel chamber and an outlet port, the fuel chamber is fluidly connected to the gaseous fuel inlet port, the outlet port is fluidly connected to the sac volume in the nozzle, an actuator system for controllably moving the axially displaceable valve needle between the closed position and the open position, an ignition liquid inlet port for connection to a source of high pressure ignition liquid, and an ignition liquid supply conduit connecting the ignition liquid inlet port to the fuel chamber, the ignition liquid supply conduit including a fixed flow restriction, the fixed flow restriction being configured to throttle the flow of ignition liquid from the ignition liquid inlet port to the fuel chamber in order to allow a small amount of ignition liquid as a constant flow of ignition fluid through the fixed flow restriction to accumulate in the fuel chamber above the valve seat when the valve needle rests on the valve seat.

By a controlled slow and continuous delivery of ignition liquid to the fuel chamber a small reservoir of ignition liquid can be formed at the bottom of the gaseous fuel chamber right above the valve seat in the period of the engine cycle where the valve needle rests on the valve seat. When the valve needle is lifted at the appropriate point in time in the engine cycle, the high-pressure gaseous fuel in the fuel chamber flows towards the hollow interior of the nozzle, i.e. into the sac volume. The small amount of ignition liquid that was deposited above the valve seat during the closing time of the fuel valve is pushed ahead of the gaseous fuel and therefore the ignition liquid enters the sac volume in the nozzle just before the gaseous fuel. The combination of hot compressed air that is already present in the sac volume due to the compression of scavenging air in the combustion chamber, ignition liquid and gaseous fuel causes ignition already inside the nozzle.

In a first possible implementation of the first aspect the fixed flow restriction is a fixed orifice flow control element.

In a second possible implementation of the first aspect the axially displaceable valve needle is slidably received in a longitudinal bore with a clearance there between, and wherein the clearance opens at one end of the longitudinal bore to the fuel chamber and wherein the ignition liquid conduit transports the ignition liquid to the clearance and wherein the clearance forms the fixed flow restriction.

In a third possible implementation of the first aspect the ignition liquid acts as a sealing liquid in the clearance.

In a fourth possible implementation of the first aspect the ignition liquid supply conduit extends from the ignition liquid inlet port to a port opening to the longitudinal bore to deliver ignition liquid to the clearance between the longitudinal bore and the axially displaceable valve needle.

In a fifth possible implementation of the first aspect the source of ignition liquid has a pressure that is higher than the pressure of the source of gaseous fuel.

In a sixth possible implementation of the first aspect the axially displaceable valve needle is operatively connected to a axially displaceable actuation piston that is slidably received in the housing and defines together with the housing an actuation chamber, the actuation chamber being fluidly connected to a control port for connection to a source of control oil.

In a seventh possible implementation of the first aspect the axially displaceable valve needle projects from the longitudinal bore into the fuel chamber fuel chamber so that the fuel chamber surrounds a portion of the axially displaceable valve needle.

In an eighth possible implementation of the first aspect the ignition liquid supply conduit extends in the housing and through the axially displaceable valve needle to fluidly connect the ignition liquid port to the clearance.

In a ninth possible implementation of the first aspect the nozzle comprises a base and an elongated nozzle body, and wherein the nozzle is connected with its base to the front end of the elongated valve housing, and wherein the nozzle has a closed tip with the nozzle holes arranged close to the tip.

The object above is also achieved according to a second aspect by providing a self-igniting internal combustion engine with a plurality of cylinders, a high pressure gaseous fuel supply system, a high pressure ignition liquid supply system, one or more fuel valves according to the first aspect provided at the cylinders of the engine and the fuel valves being connected to the high pressure gaseous fuel supply system and to the ignition liquid supply system.

In a first possible implementation of the second aspect the engine is configured to self-ignite the injected gaseous fuel with the help of ignition liquid accumulated in the fuel chamber and without the use of other ignition equipment.

In a second possible implementation of the second aspect the engine is configured to ignite the gaseous fuel upon entry of the gaseous fuel in the sac volume inside a nozzle.

In a third possible implementation of the second aspect the source of gaseous fuel delivers the gaseous fuel at high pressure to the fuel valves, and wherein the source of ignition liquid is configured to deliver the ignition liquid and a pressure that is higher than the pressure of the source of gaseous fuel.

The object above is also achieved according to a third aspect by providing a method of operating a self-igniting internal combustion engine, the method comprising supplying pressurized gaseous fuel at a first high pressure to a fuel valve of the engine, the fuel valve having a hollow nozzle with a plurality of nozzle holes connecting the interior of the nozzle to a combustion chamber in a cylinder of the engine, supplying ignition liquid at a second high pressure to the fuel valve, the second high pressure being higher than the first high pressure, controlling the injection of gaseous fuel with a moveable valve needle that cooperates with a valve seat above the hollow nozzle, a fuel chamber being arranged above the valve seat, pressuring the fuel chamber with the pressurized gaseous fuel, delivering a small continuous flow of ignition liquid to the fuel chamber and allowing the ignition liquid to accumulate above the valve seat during periods where the axially moveable valve needle rests on the valve seat, starting a gaseous fuel injection event by lifting the axially moveable valve needle from the valve seat, thereby causing the accumulated ignition liquid to enter the hollow injection nozzle just ahead of the gaseous fuel.

In a first possible implementation of the third aspect the gaseous fuel ignites inside the nozzle with the help of the ignition liquid.

In a second possible implementation of the third aspect the nozzle is kept above 300° C. throughout the engine cycle.

The object above is also achieved according to a fourth aspect by providing a fuel valve for injecting gaseous fuel into the combustion chamber of a large two-stroke low-speed turbocharged self-igniting internal combustion engine, the fuel valve comprising an elongated fuel valve housing with a rear end and a front end, a nozzle with a plurality of nozzle holes opening to a sac volume inside the nozzle, the nozzle being disposed at the front end of the elongated valve housing, the nozzle comprising a base and an elongated nozzle body, the nozzle being connected with its base to the front end of the elongated valve housing, the nozzle having a closed tip with the nozzle holes arranged close to the tip, a gaseous fuel inlet port in the elongated fuel valve housing for connection to a source of high pressure gaseous fuel, an axially displaceable valve needle 61 slidably received in a longitudinal bore in the elongated valve housing, the axially displaceable valve needle having a closed position and an open position, the axially displaceable valve needle rests on a valve seat in the closed position and the axially displaceable valve needle has lift from the valve seat in the open position, the valve seat being placed between a fuel chamber and an outlet port, the fuel chamber is fluidly connected to the gaseous fuel inlet port, the outlet port is fluidly connected to the sac volume in the nozzle, an actuator system for controllably moving the axially displaceable valve needle between the closed position and the open position, an ignition liquid inlet port for connection to a source of high pressure ignition liquid, and an ignition liquid supply conduit connecting the ignition liquid inlet port to the fuel chamber.

In a first possible implantation of the fourth aspect the ignition liquid supply conduit includes a fixed flow restriction.

Further objects, features, advantages and properties of the gaseous fuel valve, engine and method according to the present disclosure will become apparent from the detailed description.

BRIEF DESCRIPTION OF THE DRAWINGS

In the following detailed portion of the present description, the invention will be explained in more detail with reference to the exemplary embodiments shown in the drawings, in which:

FIG. 7 is a detailed view of a section of FIG. 6, FIG. 8 is a detailed sectional view of another example embodiment of a gaseous fuel injection valve for use in the engine shown in FIG. 1, FIG. 9 is an elevated view of the fuel valve of FIGS. 6 to 8, FIG. 10 is a sectional view of a nozzle for use with a fuel valve of FIGS. 6 to 9, FIG. 11 is a sectional view illustrating the position of the fuel valve of FIGS. 6 to 9 in a cylinder cover.

DETAILED DESCRIPTION OF PREFERRED EMBODIMENTS

Figure 1:
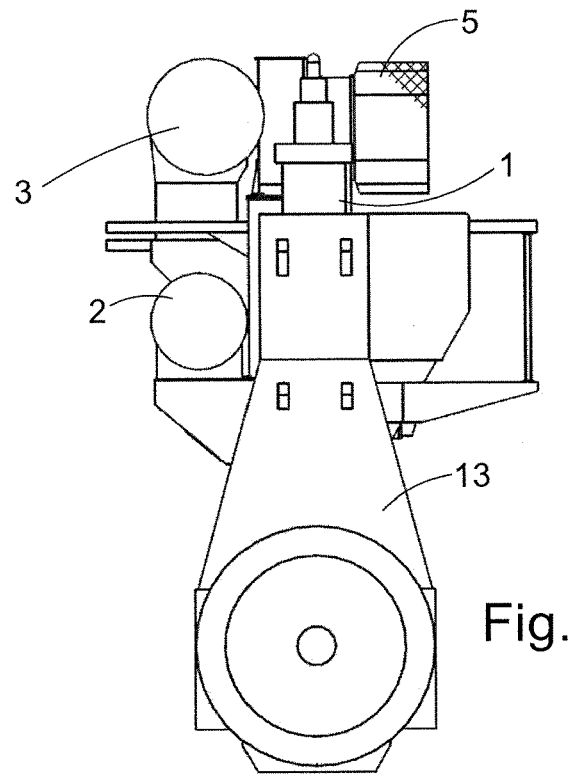
FIG. 1 is a front view of a large two-stroke diesel engine according to an example embodiment.
Figure 2:
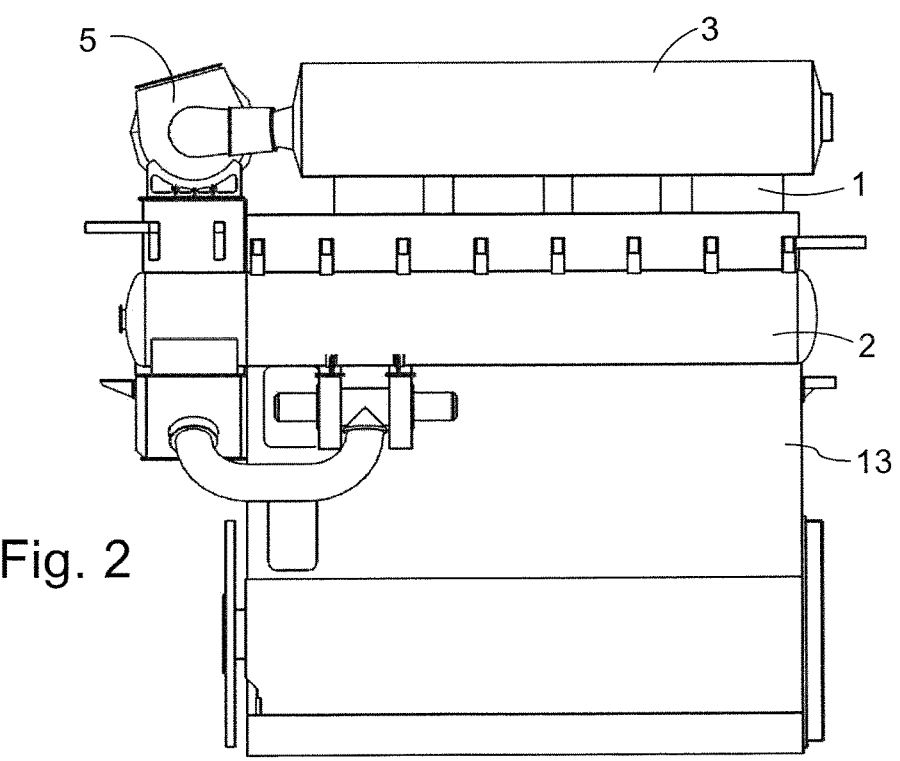
FIG. 2 is a side view of the large two-stroke engine of FIG. 1.
Figure 3:
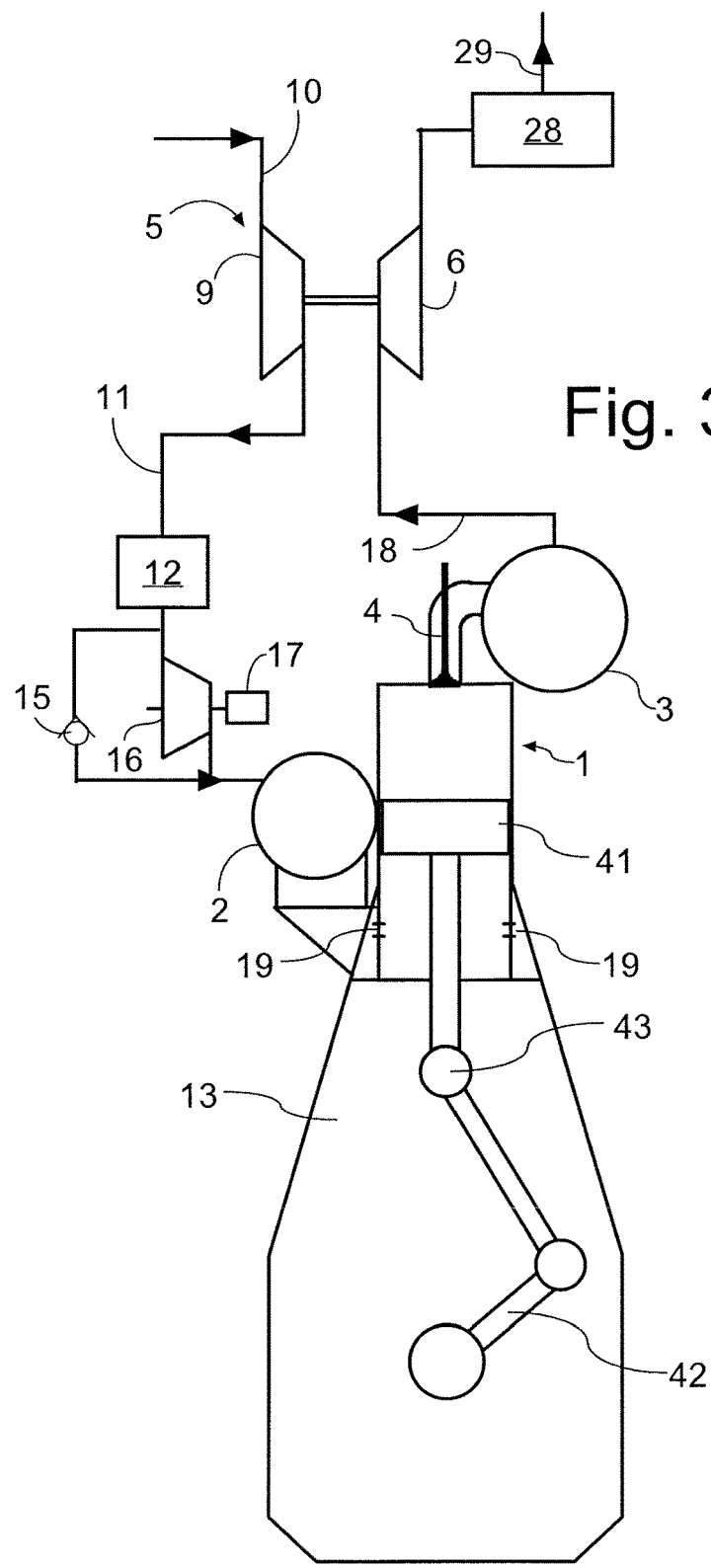
FIG. 3 is a diagrammatic representation the large two-stroke engine according to FIG. 1.

In the following detailed description, the self-igniting internal combustion engine will be described with reference to a large two-stroke low-speed turbocharged internal combustion (Diesel) engine in the example embodiments. FIGS. 1, 2 and 3 show a large low-speed turbocharged two-stroke diesel engine with a crankshaft 42 and crossheads 43. FIG. 3 shows a diagrammatic representation of a large low-speed turbocharged two-stroke diesel engine with its intake and exhaust systems. In this example embodiment the engine has four cylinders 1 in line. Large low-speed turbocharged two-stroke diesel engines have typically between four and fourteen cylinders in line, carried by an engine frame 13. The engine may e.g. be used as the main engine in an ocean going vessel or as a stationary engine for operating a generator in a power station. The total output of the engine may, for example, range from 1,000 to 110,000 kW.

The engine is in this example embodiment a diesel engine of the two-stroke uniflow type with scavenge ports at the lower region of the cylinders 1 and a central exhaust valve 4 at the top of the cylinders 1. The scavenge air is passed from the scavenge air receiver 2 to the scavenge ports (not shown) of the individual cylinders 1. A piston 41 in the cylinder 1 compresses the scavenge air, fuel is injected from fuel injection valves in the cylinder cover, combustion follows and exhaust gas is generated. When an exhaust valve 4 is opened, the exhaust gas flows through an exhaust duct associated with the cylinder 1 into the exhaust gas receiver 3 and onwards through a first exhaust conduit 18 to a turbine 6 of the turbocharger 5, from which the exhaust gas flows away through a second exhaust conduit via an economizer 28 to an outlet 29 and into the atmosphere. Through a shaft, the turbine 6 drives a compressor 9 supplied with fresh air via an air inlet 10. The compressor 9 delivers pressurized scavenge air to a scavenge air conduit 11 leading to the scavenge air receiver 2.

The scavenge air in conduit 11 passes an intercooler 12 for cooling the scavenge air—that leaves the compressor at approximately 200° C.—to a temperature between 36 and 80° C.

The cooled scavenge air passes via an auxiliary blower 16 driven by an electric motor 17 that pressurizes the scavenge air flow when the compressor 9 of the turbocharger 5 does not deliver sufficient pressure for the scavenge air receiver 2, i.e. in low or partial load conditions of the engine. At higher engine loads the turbocharger compressor 9 delivers sufficient compressed scavenge air and then the auxiliary blower 16 is bypassed via a non-return valve 15.

Figure 4:
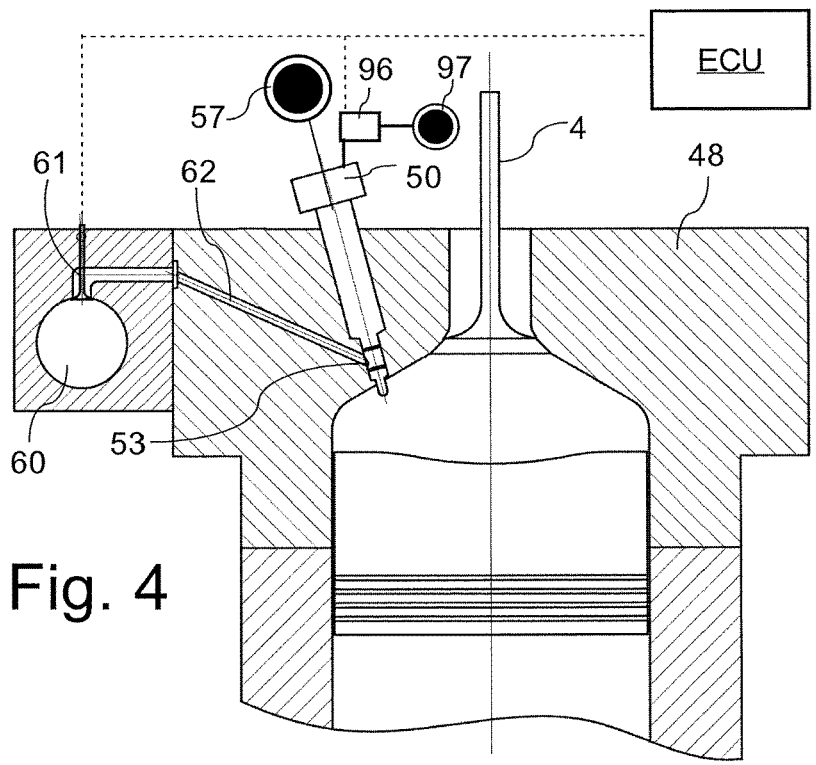
FIG. 4 is a sectional view in diagrammatic representation of an example embodiment of gaseous fuel system of the engine of FIG. 1 of the upper part of a cylinder.
Figure 5:
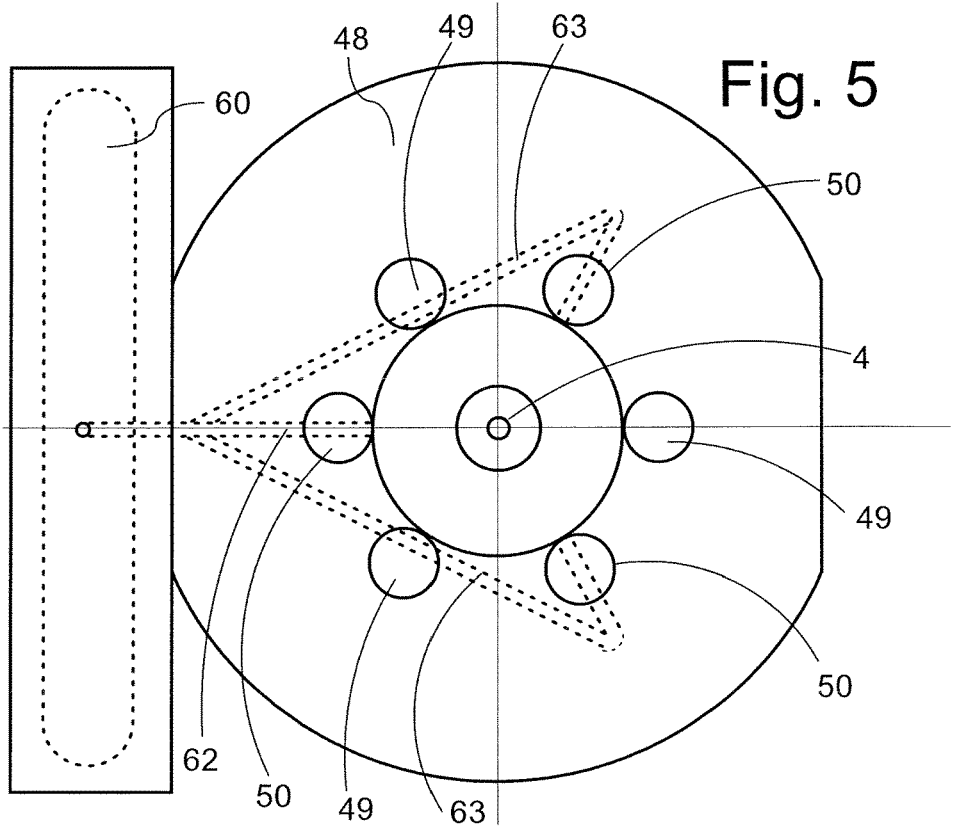
FIG. 5 is a top view in diagrammatic representation a cylinder and the gaseous fuel injection system of the embodiment of FIG. 4.

FIGS. 4 and 5 show the top of one of the plurality of cylinders 1 according to an example embodiment. The top cover 48 of the cylinders 1 is provided with three gaseous fuel valves 50 for injecting a gaseous fuel from an outlet of the fuel valves 50, such as a nozzle, into the combustion chamber in the cylinder 1.

In this disclosure "gaseous fuel" is broadly defined as any combustible fuel that is in the gaseous phase at atmospheric pressure and ambient temperature.

This example embodiment shows three gaseous fuel valves 50 per cylinder, but it should be understood that a single or two gaseous fuel valves may be sufficient, depending on the size of the combustion chamber. The gaseous fuel valve 50 has an inlet 53 connected to a gaseous fuel supply conduit 62 that supplies highly pressurized gaseous fuel to the gaseous fuel valve 50. One of the three gaseous fuel valves 50 is supplied by supply conduit 62, the other two gaseous fuel valves 50 are supplied by supply conduits 63. In this embodiment the supply conduits 62,63 are drilled holes in the top cover 48 that connect to a gas accumulator 60 associated with the cylinder 1. The gas accumulator 60 receives high pressure gas from a gas supply system (not shown) that includes gas tanks and high pressure pumps.

The gaseous fuel valve 50 also has an inlet connected to a source of pressurized ignition liquid such as 57, such as sealing oil, marine diesel, bio diesel, lubricating oil, heavy fuel oil or dimethyl ether (DME), and is configured delivering ignition liquid at high pressure that is higher than the pressure of the gaseous fuel by a more or less constant margin. The source of ignition liquid has a pressure 57 that is at least slightly above the pressure of the source of gaseous fuel 60.

Each cylinder 1 is in this example embodiment provided with a gaseous fuel accumulator 60. The gaseous fuel accumulator 60 contains an amount of gaseous fuel under high pressure (e.g. approximately 300 bar) that is ready to be delivered to the fuel valves 50 of the cylinder 1. The gaseous fuel supply conduits 62,63 extend between the gaseous fuel accumulator 60 and a respective gaseous fuel valve 50 of the cylinder 1 concerned.

A window valve 61 is arranged at the outlet of the gaseous fuel accumulator 60 and the window valve 61 controls the flow of gaseous fuel from the gaseous fuel accumulator 60 to the gaseous fuel supply conduits 62,63.

Three fuel oil valves 49 are provided in the top cover 48 for operation of the engine on fuel oil. The fuel oil valves are connected to a source of high pressure fuel oil in a well-known manner. In an embodiment (not shown) the engine is configured for operation on gaseous fuel only and in this embodiment the engine does not have fuel valves.

The engine is provided with an electronic control unit ECU that controls the operation of the engine. Signal lines connect the electronic control unit ECU to the gaseous fuel valves 50, to the fuel oil valves 49 and to the window valves 61.

The electronic control unit ECU is configured to time the injection events for the gaseous fuel valve correctly and to control the dosage of the gaseous fuel with the gaseous fuel valves 50.

The electronic control unit ECU opens and closes the window valve 61 so as to ensure that the supply conduits 62,63 are filled with high pressure gaseous fuel before the start of the gaseous fuel injection event controlled by the gaseous fuel valve 50.

Figure 6:
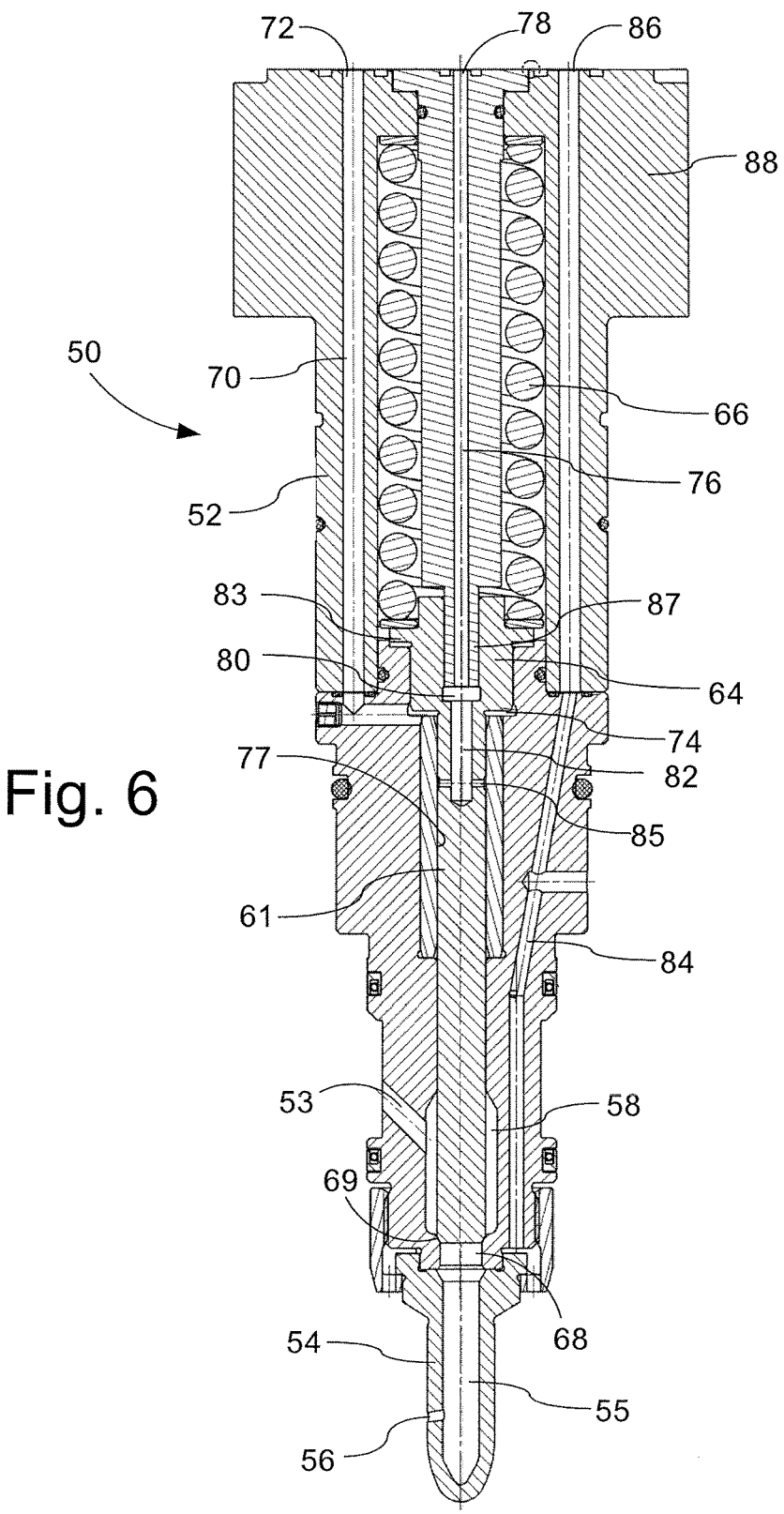
FIG. 6 is a sectional view of a gaseous fuel injection valve for use in the engine shown in FIG. 1 according to an example embodiment of the invention.

FIGS. 6, 7 and 9 show a fuel valve 50 for injecting gaseous fuel into the combustion chamber of a self-igniting internal combustion engine and for delivering ignition liquid. The fuel valve 50 has an elongated valve housing 52 with a rearmost end 88 and a nozzle 54 at the front end. The rearmost end 88 is provided with a plurality of ports, including a control port 72, an ignition liquid port 78 and gas leak detection port 86. The rearmost end 88 is enlarged to form a head and provided with bores 94 in the head for receiving bolts (not shown) that secure the fuel valve 50 in the cylinder cover 48. In the present embodiment, the fuel valves are placed around the central exhaust valve 4, i.e. relatively close to the walls of the cylinder liner. The elongated valve housing 52 and the other components of the fuel injection valve 50, as well as the nozzle 54 are in embodiment made of steel, such as stainless steel.

The hollow nozzle 54 is provided with nozzle holes 56 that are connected to the hollow interior (sac volume) of the nozzle and the nozzle holes 56 are distributed over the length and distributed radially over the nozzle 54. The nozzles are axially close to the tip and the radial distribution is in the present embodiment over a relatively narrow range of approximately 50° and the radial orientation of the nozzle holes is such that the nozzles are directed away from the walls of the cylinder liner. Further, the nozzles are directed such that they are roughly in the same direction as the direction of the swirl of the scavenge air in the combustion chamber caused by the configuration of the scavenge ports.

The tip 59 of the nozzle 54 (FIG. 10) is in this embodiment closed. The rear or base 51 of the nozzle 54 is connected to the front end of the housing 52 with a sack volume 55 in the nozzle 54 opening towards the housing 52. In an embodiment the sac volume 55 is a longitudinal bore extending from the closed tip to the base 51 and opening to the rear of the nozzle so as to connect with the opening/outlet port 68 in the front end of the elongated valve the housing 52 below the valve seat 69.

An axially displaceable valve needle 61 is slidably received with a precisely defined clearance in a longitudinal bore 77 in the elongated valve housing 52. The valve needle 61 has a tip that is configured to enter in a sealing engagement with a seat 69 that is formed in the elongated valve housing 52. In an embodiment the seat 69 is arranged close to the front end of the elongated valve housing 52. The elongated valve housing 52 is provided with a gaseous fuel inlet port 53 for connection to a source 60 of pressurized gaseous fuel, for example via the gaseous fuel supply conduits 62,63. The gaseous fuel inlet port 53 connects to a fuel chamber 58 that is located in the elongated valve housing 52 and the fuel chamber 58 surrounds a portion of the valve needle 61. The seat 69 is located between the fuel chamber 58 and the sac volume 55, so that the gaseous fuel can flow from the fuel chamber 58 to the sac volume 55 when the valve needle 61 has lift. From the sac volume 55 the gaseous fuel is injected into the combustion chamber of the cylinder 1 via the nozzle holes 56.

The axially displaceable valve needle 61 has a closed position and an open position. In the closed position the axially displaceable valve needle 61 rests on the seat 69. In its closed position the axially displaceable valve needle 61 thus prevents flow from the gaseous fuel inlet port 53 to the nozzle 54. In its open position the axially displaceable valve needle 61 has lift from the seat 69 thereby allowing flow from the gaseous fuel inlet port 53 to the nozzle 54.

A pre-tensioned helical spring 66 acts on the axially displaceable valve needle 61 and biases the valve needle 61 towards its closed position on the seat 69. However, it is understood that other means, such as a gas pressure or oil pressure can be provided to bias the valve needle 61 towards its closed position. In an embodiment, one end of the helical spring 66 engages the rear end of the elongated valve housing 52 and the other end of the helical spring 66 engages a widened section or flange 83 at the rear end of the valve needle 61, whereby the rear end of the valve needle 61 is formed by an actuation piston 64.

The gaseous fuel valve 50 is provided with an actuator system for controllably moving the axially displaceable valve needle 61 between its closed position and its open position. In this embodiment the actuator system includes an axially displaceable actuation piston 64 that is slidably received in a cylindrical portion of the elongated valve housing 52. The actuation piston 64 defines together with the elongated valve housing 52 an actuation chamber 74. In this embodiment the actuation piston 64 is an integral and rearmost part of the axially displaceable valve needle 61. However, it is understood that the actuation piston 64 can be operably connected to the valve needle 61 in various ways, such as by a threaded connection, or by welding and preferably the actuation piston moves 64 in unison with the valve needle 61, although this is not a prerequisite.

The actuation chamber 74 is fluidly connected to the control oil port 72 via a control oil conduit 70. The control oil port 72 is connected to an electronic control oil valve 96 (FIG. 4) that is in turn connected to a source of high-pressure control oil 97. The electronic control oil valve 96 is preferably of the on/off type and receives an electric control signal from the electronic control unit ECU to control the injection events.

In other embodiments (not shown) the valve needle can be actuated by other actuation means, such as a solenoid or a linear electric motor.

The actuation piston 64 is provided with a preferably concentric cylinder that opens towards the rear end of the housing and a stationary piston 87 is slidably received inside this cylinder. The actuation piston 64 is displaceable relative to the stationary piston 87. The cylinder inside the actuation piston 64 defines a chamber 80 together with the stationary piston 87 that provides space for actuation piston 64 to move axially.

The elongated valve housing 52 is provided with an ignition liquid port 78 for connection to the source of ignition liquid 57. An ignition liquid supply conduit 76 extends axially in the elongated valve housing and through the stationary piston 87 and fluidly connects the ignition liquid port 78 to the chamber 80.

A second portion of the ignition liquid delivery conduit extends to coaxially in the valve needle as a bore 82. Radial channels 85 extend in the axially displaceable valve needle 61 from the bore 82 to the outer surface of the axially displaceable valve needle 61 from a port for allowing ignition liquid to be supplied to the clearance between the elongated valve housing 52 and the axially movable valve needle 61 to thereby lubricate and seal the valve needle 61, thus allowing the ignition liquid to be used as sealing oil. The ignition liquid flows through the clearance both upwards to the actuation chamber 74 and downwards to the fuel chamber 58. The portion of the ignition liquid that flows to the actuation chamber 74 mixes with the control oil. This has no substantial effect on the control oil. The portion of the ignition liquid that flows to the fuel chamber 58 and accumulates at the bottom of the fuel chamber 58 i.e. just above the valve seat 69 while the axially movable valve needle 61 rests on the valve seat 69, as shown in FIG. 8.

The dimensions of the clearance are precisely controlled and selected so that the appropriate amount of ignition liquid is collected at the bottom of the fuel chamber 58 in the time during an engine cycle where the axially movable valve member 61 rests on the valve seat 69. An appropriate amount of ignition liquid is the amount that is sufficient for creating a reliable and stable ignition, may for example be in the range of 0.2 mg to 200 mg, depending e.g. on the engine size and load. The dimensions of the clearance are chosen such in relation to the properties of the ignition liquid, such as e.g. viscosity, that a constant flow of ignition liquid of an appropriate magnitude is achieved when the source of ignition liquid has a pressure that is a margin above the pressure of the source of gaseous fuel.

A gas leak detection channel 84 in the elongated valve housing 52 leads to a gas leak detection port 86 for detection of gas leaks.

The injection event of the gaseous fuel is controlled by the electronic control unit ECU through the length of the opening time of the gaseous fuel valve 50, i.e. the amount of gas injected in one injection event is determined by the length of the opening time. Thus, upon a signal from the electronic control unit ECU the control oil pressure is raised in the actuation chamber 74 and the valve needle 61 is lifted from the seat 69 in a movement from its closed position to its open position. The valve needle 61 will always perform the full stroke from its closed position to its open position when the control oil pressure is raised and the increased pressure in the actuation chamber 74 urges the actuation piston 64 against the force of the helical spring 66 in axial direction away from the nozzle 54 and the seat 69.

The ignition liquid accumulated at the bottom of the fuel chamber 58 (FIG. 8) enters the sack volume 55 in the nozzle 54 first, followed by the gaseous fuel, i.e. the gaseous fuel pushes the ignition liquid ahead and into the sack volume 55. Thus, the ignition liquid that was accumulated in the combustion chamber 58 will enter the sac volume 55 in the nozzle 54 just ahead of the gaseous fuel. At the moment just before the opening of the fuel valve 50, the sac volume 55 is filled with a mixture of compressed hot air and residual unburned gaseous fuel, due to the compression of the scavenging air in the combustion chamber (the nozzle holes 56 allow flow of air from the combustion chamber into the sack space 55). Thus, shortly after the opening of the fuel valve 50 there is hot compressed air, ignition liquid and gaseous fuel present inside the sac volume 55. This leads to ignition of the gaseous fuel already inside the hollow nozzle 54.

At the end of the injection event the ECU removes the pressure from the actuation chamber and the force of the helical spring 66 causes the valve needle 61 to return to the valve seat 69.

Figure 12:
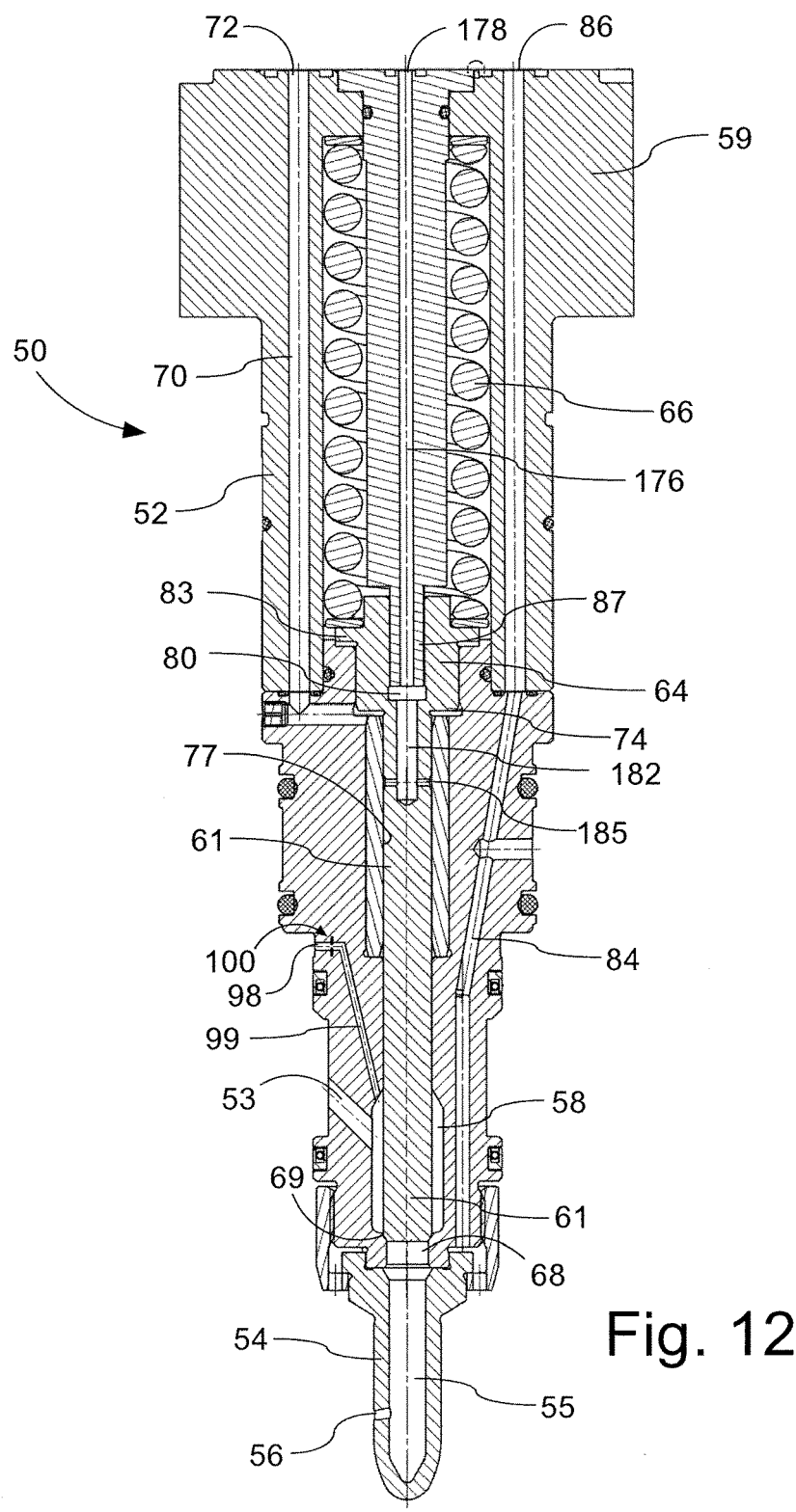
FIG. 12 is a sectional view of a gaseous fuel injection valve according to another embodiment.

FIG. 12 shows another embodiment of the fuel valve 50, that is essentially identical to the embodiment of the previous Figs., except that the clearance 77 is such in relation to the viscosity of the sealing oil that is provided from a source of sealing via port 178 and conduit 176, axial bore 182 and radial bores 185 that practically no sealing oil leaks into the combustion chamber. Instead, a separate combustion liquid channel 99 connects the fuel chamber 58 to ignition liquid port 98. The combustion liquid channel 99 includes a fixed restriction 100, for example in the form of a fixed orifice restriction in order to throttle and control the amount of ignition liquid that is delivered to the fuel chamber 58 during the closed period of the axially movable valve needle 61.

Ignition liquid port 98 is connected to a source of high pressure ignition liquid with a pressure that is a margin above the pressure of the source of gaseous fuel. The operation of the valve according to the embodiment of FIG. 12 is essentially identical to the operation of the fuel valve described with the previous Figs.

In an embodiment (not shown) the actuation means comprises a solenoid or linear electric motor and a piston and control oil is not needed.

The self-igniting internal combustion engine is operated by supplying pressurized gaseous fuel at a first high pressure to a fuel valve 50 of the engine. The ignition liquid is supplied at a second high pressure to the fuel valve 50. The second high pressure is higher than the first high pressure. The injection of gaseous fuel is controlled with a moveable valve needle 61 that cooperates with a valve seat 69 above the hollow nozzle 54. A fuel chamber 58 is arranged above the valve seat 69. The fuel chamber 58 is pressurized with gaseous fuel. A small continuous flow of ignition liquid is delivered to the fuel chamber 58 and the ignition liquid is accumulated above the valve seat 69 during periods where the valve needle 61 rests on the valve seat 69. A gaseous fuel injection event is started by lifting the axially movable valve needle 61 from the valve seat 69, thereby causing the accumulated ignition liquid to enter the hollow injection nozzle 54 just ahead of the gaseous fuel. The gaseous fuel then ignites inside the nozzle 54 with the help of the ignition liquid.

The engine is configured to self-ignite the injected gaseous fuel with the help of the ignition liquid and without the use of other ignition equipment.

The engine is configured to ignite the gaseous fuel upon entry of the gaseous fuel in chamber inside a nozzle.

In an embodiment the nozzle 54 is kept above 300° C. throughout the engine cycle. In an embodiment the temperature inside the hollow nozzle 54 is approximately 600 degrees C. at the end of the compression stroke.

The term "comprising" as used in the claims does not exclude other elements or steps. The term "a" or "an" as used in the claims does not exclude a plurality. The electronic control unit may fulfill the functions of several means recited in the claims.

The reference signs used in the claims shall not be construed as limiting the scope.

Although the present invention has been described in detail for purpose of illustration, it is understood that such detail is solely for that purpose, and variations can be made therein by those skilled in the art without departing from the scope of the invention.

The invention claimed is:

1. A fuel valve for injecting gaseous fuel into the combustion chamber of a large two-stroke low-speed turbocharged self-igniting internal combustion engine, said fuel valve comprising: an elongated fuel valve housing with a rear end and a front end, a nozzle with a plurality of nozzle holes opening to a sac volume inside the nozzle, said nozzle being disposed at the front end of said elongated fuel valve housing, said nozzle comprising a base and an elongated nozzle body, said nozzle being connected with the base to said front end of said elongated fuel valve housing, said nozzle having a closed tip with said plurality of nozzle holes arranged close to said closed tip, a gaseous fuel inlet port in said elongated fuel valve housing for connection to a source of high pressure gaseous fuel, an axially displaceable valve needle slidably received in a longitudinal bore in said elongated fuel valve housing, said axially displaceable valve needle having a closed position and an open position, said axially displaceable valve needle rests on a valve seat in said closed position and said axially displaceable valve needle has lift from said valve seat in said open position, said valve seat being placed between a fuel chamber and an outlet port, said fuel chamber is fluidly connected to said gaseous fuel inlet port, said outlet port is fluidly connected to said sac volume in said nozzle, an actuator system for controllably moving said axially displaceable valve needle between said closed position and said open position, an ignition liquid inlet port for connection to a source of high pressure ignition liquid, wherein said source of high pressure ignition liquid has a pressure that is higher than the pressure of the source of high pressure gaseous fuel, and an ignition liquid supply conduit connecting said ignition liquid inlet port to said fuel chamber, said ignition liquid supply conduit including a fixed flow restriction, said fixed flow restriction being configured to throttle the flow of ignition liquid from said ignition liquid inlet port to said fuel chamber in order to allow a small amount of ignition liquid as a constant flow of ignition fluid through said fixed flow restriction to accumulate in the fuel chamber above the valve seat when the axially displaceable valve needle rests on the valve seat.

2. A fuel valve according to claim 1, wherein said fixed flow restriction is a fixed orifice flow control element (100).

3. A fuel valve according to claim 1, wherein said axially displaceable valve needle is slidably received in the longitudinal bore with a clearance there between, and wherein said clearance opens at one end of said longitudinal bore to said fuel chamber and wherein said ignition liquid supply conduit transports said ignition liquid to said clearance and wherein said clearance forms said fixed flow restriction.

4. A fuel valve according to claim 3, wherein said ignition liquid acts as a sealing liquid in said clearance.

5. A fuel valve according to claim 3, wherein said ignition liquid supply conduit (76) extends from said ignition liquid inlet port (78) to a port opening to said longitudinal bore (77) to deliver ignition liquid to the clearance between said longitudinal bore (77) and the axially displaceable valve needle (61).

6. A fuel valve according to claim 1, wherein said axially displaceable valve needle is operatively connected to an axially displaceable actuation piston that is slidably received in said elongated fuel valve housing and defines together with said elongated fuel valve housing an actuation chamber, said actuation chamber being fluidly connected to a control port for connection to a source of control oil.

7. A fuel valve according to claim 1, wherein said axially displaceable valve needle (61) projects from said longitudinal bore (77) into said fuel chamber (58) so that the fuel chamber (58) surrounds a portion of the axially displaceable valve needle (61).

8. A fuel valve according to claim 3, wherein said ignition liquid supply conduit extends in said elongated fuel valve housing and through said axially displaceable valve needle to fluidly connect said ignition liquid inlet port to said clearance.

9. A large two-stroke low-speed turbocharged self-igniting internal combustion engine with a plurality of cylinders, a high pressure gaseous fuel supply system, a high pressure ignition liquid supply system, one or more fuel valves according to claim 1 provided at the cylinders of the engine and said fuel valves being connected to said high pressure gaseous fuel supply system and to said high pressure ignition liquid supply system.

10. An engine according to claim 9, wherein said engine is configured to self-ignite the injected gaseous fuel with the help of ignition liquid accumulated in said fuel chamber (58) and without the use of other ignition equipment.

11. An engine according to claim 9, wherein said engine is configured to ignite said gaseous fuel upon entry of the gaseous fuel in the sac volume inside said nozzle.

12. An engine according to claim 9, wherein said source of gaseous fuel delivers said gaseous fuel at high pressure to said fuel valves, and wherein said source of high pressure ignition liquid is configured to deliver said ignition liquid at a pressure that is higher than the pressure of said source of high pressure gaseous fuel.

13. A method of operating a large two-stroke low-speed turbocharged self-igniting internal combustion engine, said method comprising: supplying pressurized gaseous fuel at a first high pressure to a fuel valve of said engine, said fuel valve having an elongated fuel valve housing with a rear end and a front end, said fuel valve having a hollow nozzle with a plurality of nozzle holes connecting an interior of said hollow nozzle to a combustion chamber in a cylinder of said engine, said hollow nozzle comprising a base and an elongated nozzle body, said hollow nozzle being connected with the base to said front end of said elongated fuel valve housing, said hollow nozzle having a closed tip with said plurality of nozzle holes arranged close to said closed tip, supplying ignition liquid at a second high pressure to said fuel valve, said second high pressure being higher than said first high pressure, controlling the injection of gaseous fuel with an axially moveable valve needle that cooperates with a valve seat above said hollow nozzle, a fuel chamber being arranged above said valve seat, pressuring said fuel chamber with said gaseous fuel, delivering a small continuous flow of ignition liquid to said fuel chamber and allowing said ignition liquid to accumulate above the valve seat during periods where the axially moveable valve needle rests on the valve seat, starting a gaseous fuel injection event by lifting said axially moveable valve needle from said valve seat, thereby causing said ignition liquid to enter the hollow nozzle just ahead of the gaseous fuel.

14. A method according to claim 13, wherein said gaseous fuel ignites inside said nozzle (54) with the help of said ignition liquid.

15. A method according to claim 13, wherein the hollow nozzle is kept above 300° C. throughout operation of the engine.

* * * * *